United States Patent [19]

Andersen

[11] Patent Number: 4,722,723
[45] Date of Patent: Feb. 2, 1988

[54] ROTATABLE DRUM ASSEMBLY

[75] Inventor: Henning Andersen, Copenhagen, Denmark

[73] Assignee: F. L. Smidth & Co. A/S, Copenhagen, Denmark

[21] Appl. No.: 940,620

[22] Filed: Dec. 11, 1986

[30] Foreign Application Priority Data

Jan. 27, 1986 [GB] United Kingdom ............... 8601928

[51] Int. Cl.⁴ ............................................ F16H 55/12
[52] U.S. Cl. ................................................. 474/162
[58] Field of Search ................ 474/152, 162, 165, 161

[56] References Cited

U.S. PATENT DOCUMENTS 2,999,396 9/1961 Kaczmarski .................... 474/162 X
3,610,066 10/1971 Rychlik ........................... 474/161 X

FOREIGN PATENT DOCUMENTS 2604425 8/1977 Fed. Rep. of Germany .

Primary Examiner—Stephen J. Novosad
Assistant Examiner—Thuy M. Bui
Attorney, Agent, or Firm—Brumbaugh, Graves, Donohue & Raymond

[57] ABSTRACT

A rotatable drum (1) carries, and is driven by, a gear rim (3), with bevel toothing (12), via a flexible frustoconical casing (5) which accommodates distortions of the drum and absorbs axial loading resulting from the bevel toothing. Flexing of the gear rim is resisted on one side by the stiffness of the casing (5) and on the other side by a stiffening ring (9).

2 Claims, 1 Drawing Figure

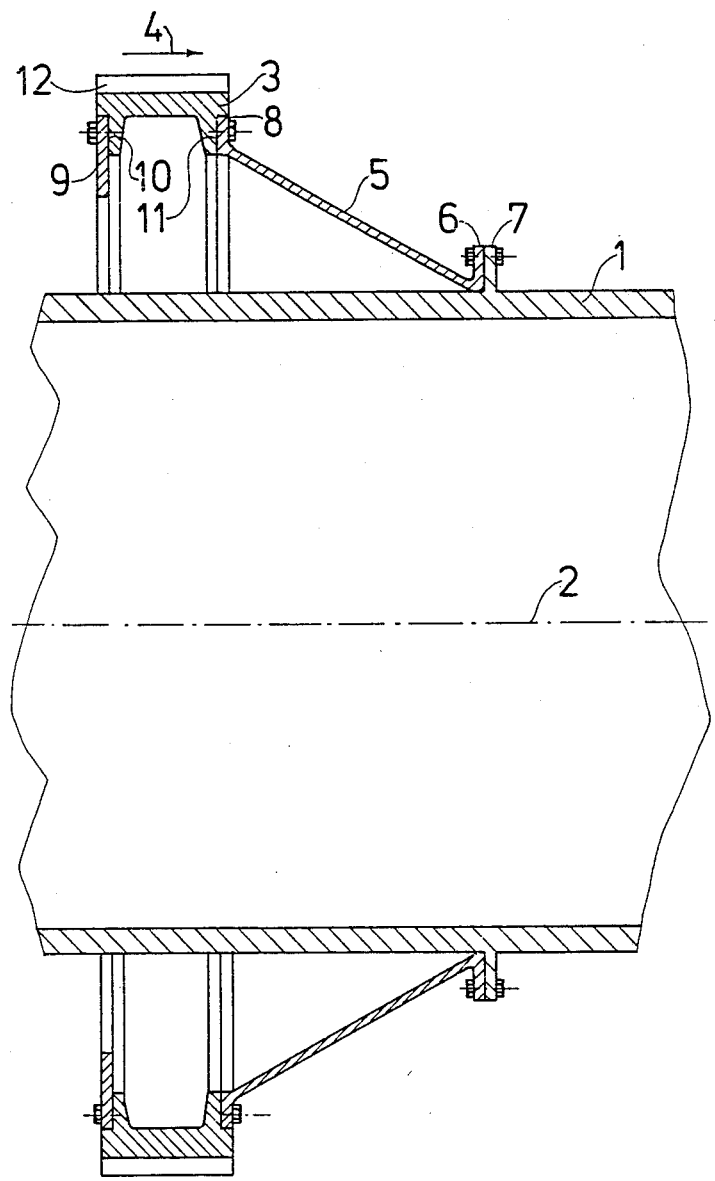

ROTATABLE DRUM ASSEMBLY

BACKGROUND OF THE INVENTION

The invention relates to a drive for a rotatable drum, such as a rotary kiln or a tube mill, in which a gear rim is mounted on, and radially spaced from, the outside of the drum by means of a flexible connection.

It is known to mount a gear rim on a rotatable drum via a flexible connection providing compensation for possible out-of-roundness of the drum and preventing, e.g. thermal, deformation of the drum from causing substantial loads on the gear rim.

From U.S. Pat. No. 2,999,396 there is known a gear rim which is connected to a rotary kiln via leaf springs, the springs being secured at one end to the gear rim and at the other end to the drum.

From FIG. 1 of DE-A-2604425 is known a flexible connection between a gear rim and the outside of a tube mill comprising a tube section disposed coaxially with the tube mill and radially spaced both from the outside of the tube mill and from the gear rim, and being resiliently connected at one end to the tube mill and at the other end to the gear rim. This elastic connection too is intended for compensation for out-of-roundness and thermal deformations of the tube mill casing so as to prevent such deformations from loading the gear rim.

However, none of the known flexible connections are applicable for transferring to the drum axial loads deriving from a bevel toothing of the drive. It is an advantage of bevel toothing as compared with straight toothing that it is possible to make the gear rim considerably narrower for transfer of the same torque. However, an axial load acting on the gear rim of the known drives will cause the gear rim to tilt, with the consequence that the derived line contact between the teeth of the gear rim and those of a complementary driving gear is replaced by point contact with resultant heavily increased local wear on the teeth.

SUMMARY OF THE INVENTION

It is the object of the invention to overcome the above disadvantages of the known drives, and, according to the invention, a drum assembly, comprising a rotatable drum and a gear rim mounted on the outside of the drum and radially spaced therefrom by means of a flexible connection, is characterised in that the gear rim has bevel toothing; in that the flexible connection is a frustoconical casing, the narrower end of which has a diameter substantially corresponding to the outer diameter of the drum and is secured to the outside of the drum, and the wider end of which has a diameter substantially corresponding to the diameter of the gear rim and is secured to one side of the gear rim, the casing extending from its connection to the gear rim in the direction such that the casing receives a compressive loading due to the bevel toothing of the gear rim cooperating, in use, with a complementary driving gear; and in that the gear rim is provided on its other side with a stiffening ring having substantially the same radial stiffness as that of the casing, and being spaced from the drum.

As compared with the known flexible connections the frustoconical casing constitutes a very simple and robust construction capable of compensating for out-of-roundness and thermal deformations of the drum without generating significant loads acting on the gear rim, and also of transferring even heavy axial loads due to the bevel toothing of the gear rim from the latter to the drum.

The stiffening ring ensures that the gear rim axis under all axial and radial loads constantly maintains its parallelism with the drum axis so as to ensure constant line contact between the teeth of the gear rim and those of the appertaining drive wheel.

The gear rim may be welded to the frustoconical casing and the stiffening ring, respectively, but it is more expedient if the casing and the stiffening ring are bolted to similar bearing surfaces on opposite sides of the gear rim whereby the gear rim is reversible. In case of possible wear on the one side of the tooth flanks, the gear rim may be reversed and easily and directly bolted to the casing and the stiffening ring again.

BRIEF DESCRIPTION OF THE DRAWING

The invention will now be explained in more detail by way of an example with reference to the accompanying drawing FIG. 1, which diagrammatically shows an axial section through a part of a drum assembly.

DESCRIPTION OF THE PREFERRED EMBODIMENT

As shown, the drum 1, e.g. a rotary kiln or a tube mill, is rotatable about an axis 2, and driven via a gear rim 3 with bevel toothing 12, which in known manner imparts, when driven, an axial force to the gear rim as indicated by an arrow 4. The gear rim 3 is in known manner driven by a driving gear, not shown.

The gear rim 3 is connected to the drum 1 through a frustoconical casing 5 encircling the drum, the narrower end of the casing having a diameter corresponding to the outer diameter of the drum and being bolted to the drum 1 via a flange 6 on the casing 5 and an annular flange 7 on the drum 1.

At its wider end the casing 5 abuts and is secured to that side of the gear rim 3 facing the direction in which the rim is urged by the action of the bevel toothing as indicated by the arrow 4. At this end the casing 5 is, as shown, provided with a flange 8 which is bolted on the gear rim 3.

The opposite side of the gear rim is provided with a bolted-on stiffening ring 9.

Two recess shaped bearing surfaces 10 and 11 on respective sides of the gear rim 3, with bolt holes for mounting the flange 8 of the casing and the stiffening ring 9 to the gear rim, are uniform, so that after possible wear on the teeth the gear rim may readily be removed, reversed and bolted to the flange 8 and the ring 9 again.

The frustoconical casing 5 constitutes the radial flexible connection between the gear rim 3 and the drum 1 and makes it possible to prevent loads deriving from out-of-roundness and thermal deformations of the drum from being transmitted to any significant extent to the gear rim 3.

The stiffening ring 9 ensures that the possible deformation of the casing 5 does not offset the axis of the gear rim 3 from its parallism with that of the drum 1, and thus ensures the desired constant line contact between the teeth of the gear rim and those of the driving gear.

I claim:

1. A drum assembly comprising a rotatable drum and a gear rim mounted on the outside of said drum and radially spaced therefrom by means of a flexible connection; wherein:

(a) said gear rim has bevel toothing;

(b) said flexible connection is a frustoconical casing, a narrower end of which has a diameter substantially corresponding to the outer diameter of said drum and is secured to the outside thereof, and a wider end of which has a diameter substantially corresponding to the diameter of the gear rim and is secured to the one side of said rim, said casing extending from its connection to said gear rim in a direction such that said casing receives a compressive loading due to said bevel toothing of said gear rim cooperating, in use, with a complementary driving gear; and, (c) said gear rim is provided on the other side thereof with a stiffening ring having substantially the same radial stiffness as that of said casing, and being spaced from said drum, such that said stiffening ring causes the axis of said gear rim to maintain substantial parallelism with the axis of said rotatable drum under normally encountered axial and radial loads.

2. An assembly according to claim 1, wherein said casing and said stiffening ring are bolted to similar bearing surfaces on opposite sides of said gear rim whereby the gear rim is reversible.

* * * * *